J. W. SOUTHER.
SHIPPING JACK.
APPLICATION FILED FEB. 1, 1917.
1,242,617.
Patented Oct. 9, 1917.
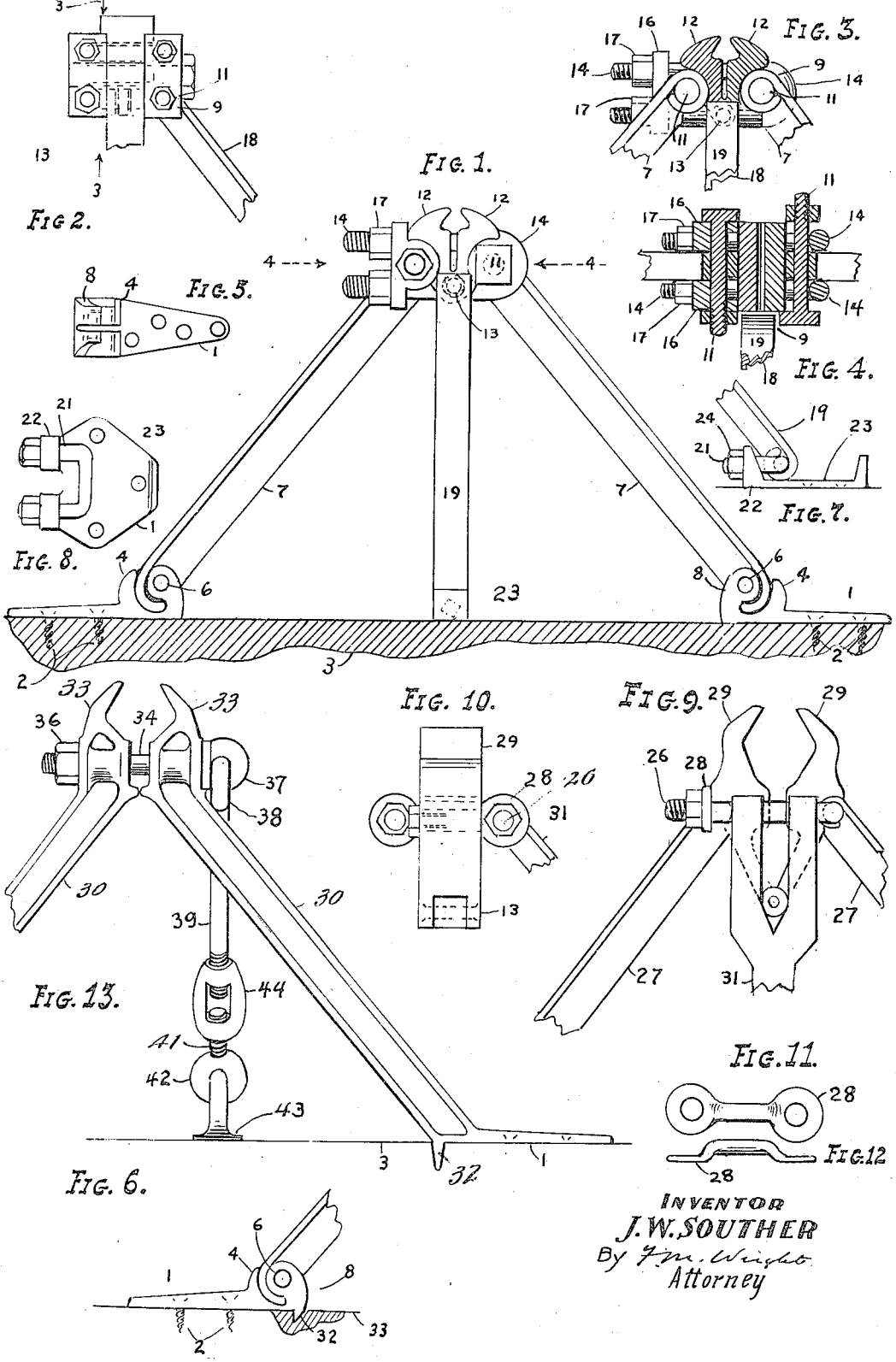
INVENTOR
J. W. SOUTHER
By F. M. Wright
Attorney

UNITED STATES PATENT OFFICE.

JOSEPH W. SOUTHER, OF SAN FRANCISCO, CALIFORNIA.

SHIPPING-JACK.

1,242,617.　　　Specification of Letters Patent.　　Patented Oct. 9, 1917.

Application filed February 1, 1917. Serial No. 145,983.

*To all whom it may concern:*

Be it known that I, JOSEPH W. SOUTHER, a citizen of the United States, residing at San Francisco, in the county of San Francisco and State of California, have invented new and useful Improvements in Shipping-Jacks, of which the following is a specification.

The object of the present invention is to provide improved shipping jacks for supporting automobiles in railroad cars, which will be simple and inexpensive in construction, and efficient and convenient in use.

In the accompanying drawing, Figure 1 is a side view of one form of my improved shipping jack; Fig. 2 is a similar view, taken at right angles to Fig. 1, of the upper portion thereof; Fig. 3 is a section on the line 3—3 of Fig. 2; Fig. 4 is a section on the line 4—4 of Fig. 1; Fig. 5 is a plan view of a base; Fig. 6 is a side view of another form of a base; Fig. 7 is a side view of a base; Fig. 8 is a plan view of the same; Fig. 9 is a broken side view of another form of the invention; Fig. 10 is a similar view taken at right angles to Fig. 9; Fig. 11 is a plan view of an eye bolt; Fig. 12 is a side view of the same; Fig. 13 is a broken side view of another form of the invention.

Referring to Figs. 1 to 8 which illustrate one form of my improved shipping jack for use with the front axle of an automobile, 1 indicates base plates adapted to be secured by screws 2 to a floor 3 of a railroad car, and each provided with two short standards or lugs 8, through which extends a pivot bolt 6, on which is pivoted the lower end of a T-bar or strut 7, said struts converging upwardly in the same vertical plane. The transverse member of each bar is, at the lower end, curved about the bolt as center, and received between said standards 8 and supports 4, which are also curved about said bolt as center, and serve as an additional support for the lower end of said strut. Said members at the upper end of the struts are curled over, as shown at 9, to form bearings for bolts 11, and to engage concavities in rear portions of upwardly extending jaws 12, hinged together, as shown at 13. Said jaws are sufficiently large to receive between them an axle of a car without removing its wheels. Around one of said bolts 11 on both sides of the corresponding jaw, extend horizontally but each having its legs in a vertical plane, U-bolts 14, said U-bolts also extending past the other bolt 11 and through holes in members of angle plates 16, said angle plates having also, in the members at right angles to the first-named members, holes through which said other bolt 11 passes. Nuts 17 are screwed on the ends of said U-bolts.

Around the lower member of the U-bolt 14, on one side of the jack, extends the curled-over upper end of the transverse member 18 of an angle-iron strut 19 extending in a vertical plane at right-angles to that of the struts 7, its lower end having an eye engaged by the central portion of a U-bolt 21, extending through holes in a lug 22, extending vertically from a base plate 23, secured by screws to the floor of the car, said U-bolt 21 being secured to said lug by nuts 24.

In use, the front axle of the automobile is raised over the jaws of two of the shipping jacks and dropped between them, and then the jaws are tightened against the axle by screwing up the nuts 17 on the U-bolts 14. The base plates are then secured by the screws to the car floor.

In the form of the invention shown in Figs. 9 and 10, which is adapted for supporting the rear axle of an automobile, instead of there being used two U-bolts extending in vertical planes, there is used a single U-bolt 26 extending in a horizontal plane. The central portion of the U-bolt extends through an eye in the upper end of one of two struts 27 similar to the struts 7, while its side members extend through the eyes of a double eye-bar 28, of which the central portion extends through the eye in the top of the other strut 27.

It is necessary that the jaws 29 in this latter form of the invention be spread apart farther than the jaws 12, and therefore they are made longer. They are hinged together, as shown at 13'. The U-bolt 26 is longer than the U-bolts 14.

The transverse supporting strut 31, corresponding to the strut 19 in the first form of the invention, is bifurcated at its upper end, and both of the forks are pivoted on one member of the U-bolt 26.

The base plate 1 are for use with a lower deck of a freight car. For use with an upper deck thereof each base plate is formed with a depending lug or tooth 32 (Fig. 6)

adapted to engage the floor 33 of the upper deck.

In the form of the invention illustrated in Fig. 10, struts 30 are each formed in one piece with its base-plate and each strut is formed integral with a jaw 33. Said jaws are drawn together by means of a bolt 34 passing through said jaws, and a nut 36 screwed on said bolt. Through the head 37 of the bolt extends a loop 38, to which is attached one end of a tie-section 39, another tie-section 41 being attached to its lower end by a loop 42 to a foot-plate 43 secured to the floor of the car. The other ends of said tie-section are threaded right and left and engaged by a turn-buckle 44. The jaws and the height of the struts differ for the two axles of the car, those of the front axle being here shown and those for the rear axle, being farther apart, and resembling those shown in Fig. 9, while the struts are higher than for the front axle.

In use the jaws will be first tightened upon the axles, and then the base-plates will be secured to the floor of the car, and, if necessary, the turn-buckle will be turned to draw the tie-sections together.

I claim:—

In a shipping jack, the combination of jaws sufficiently large to receive between them an axle of an automobile without removing its wheels, struts supporting said jaws, and adapted to be secured to the floor of the car, a bolt for drawing said jaws together, a device secured at one end to said bolt and at the other end to the floor of the car, and means for lengthening or shortening said device.

JOS. W. SOUTHER.